May 14, 1929.  B. D. RITHOLZ  1,712,847
EYE TESTING DEVICE
Filed Feb. 12, 1927
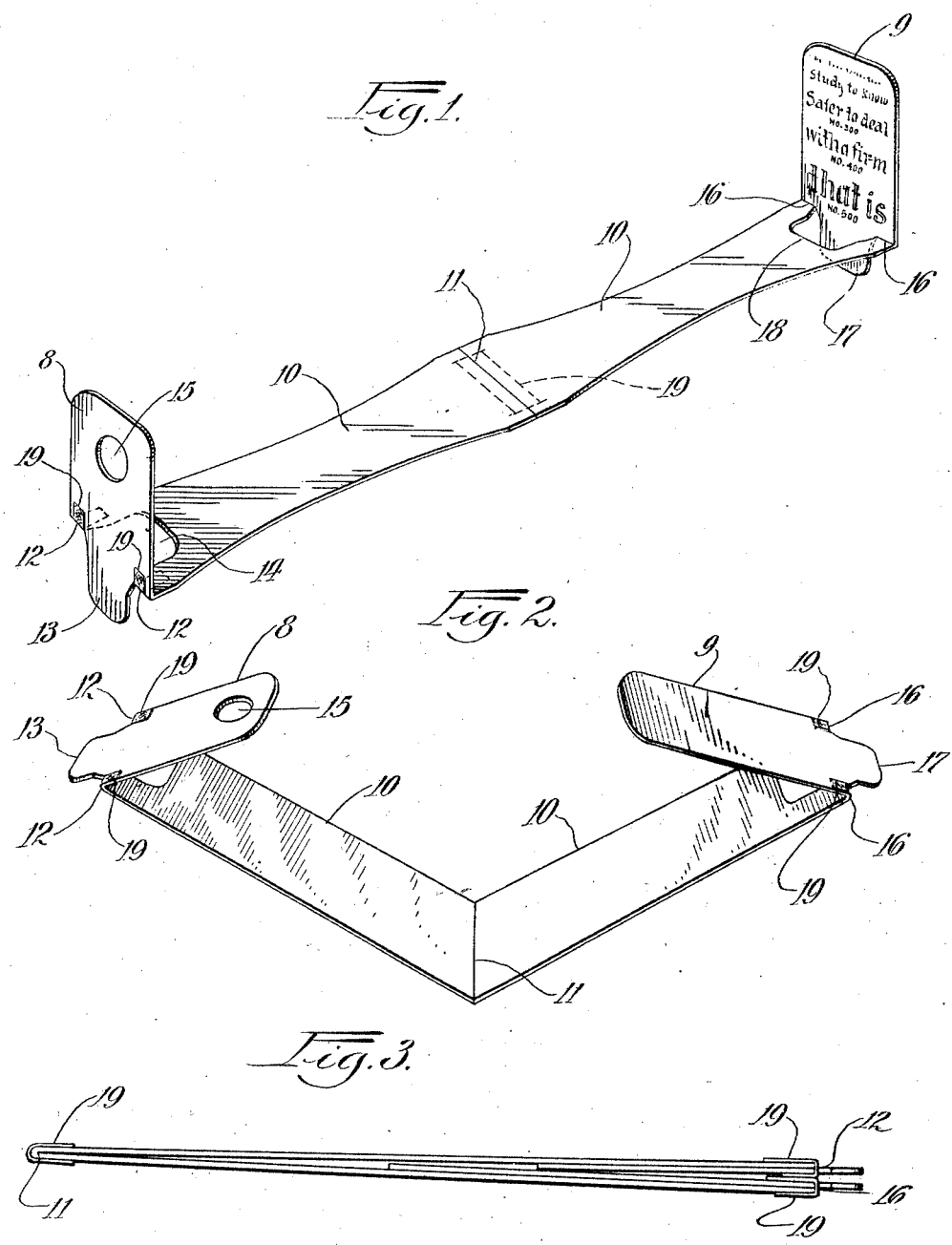

Patented May 14, 1929.

1,712,847

UNITED STATES PATENT OFFICE.

BENJAMIN D. RITHOLZ, OF CHICAGO, ILLINOIS, ASSIGNOR TO NATIONAL WATCH & JEWELRY CO., OF CHICAGO, ILLINOIS, A CORPORATION OF ILLINOIS.

EYE-TESTING DEVICE.

Application filed February 12, 1927. Serial No. 167,835.

This invention relates to eye testing devices and its object is to provide a novel device of simple construction which can be easily operated for testing eyes so that any individual may determine the information necessary to enable an optician to make the proper lenses for correcting defects of sight.

And a further object of the invention is to provide an eye testing device of simple construction which can be manufactured at low cost and furnished without cost to individuals for testing their own eyes and which can be folded in compact form for transmission through the mails. I have illustrated the invention in several forms in the accompanying drawings and referring thereto:

Fig. 1 is a perspective view of a preferred form of the invention in open position ready for use.

Fig. 2 illustrates this form of the invention partly folded.

Fig. 3 shows the device of Figs. 1 and 2 folded.

In Figs. 1-3 the device is made of cardboard and comprises an eye member 8 and a chart member 9 which are foldably mounted on the outer ends of a flexible connecting member which comprises two parts 10, 10 foldable at 11. The eye member 8 is hinged at 12 to the flexible connecting member 10 so that it can be folded upon this member, or swung to upright operative positive position, as shown in Fig. 1. The eye member has a projection 13 which is cut out at 14 from the connecting member 10 and which projects below the connecting member and forms a handle to facilitate use of the device when the eye member is in operative position. The eye member has an opening 15 through which the chart on the chart member 9 may be read, and this chart member is foldably hinged at 16 to the connecting member and like the eye member is also provided with a projection 17 cut out at 18 from the connecting member 10 to form a handle like the handle projection 13 on the eye member. The hinges 12, 16 and 11 may be made by scoring the cardboard so that the parts can be folded on the score lines, but these hinge connections may be reinforced by pasting fabric material thereover on the outer side of the device, as indicated at 19. The several parts may be made separate and hinged together in the same manner if desired. This cardboard device may be folded in compact form, as shown in Fig. 3 and opened to operative position, as shown in Fig. 1.

My invention provides a simple and inexpensive device which can be easily used by any individual for determining defects of sight. The connecting member will preferably be made to space the eye member and the chart member approximately thirteen inches apart so that the chart may be sighted through the opening in the eye member at standard reading distance. The chart member will be provided with a standard eye chart and each line will bear a lens number by which glasses may be ordered. The device embodies a pivotal foldable mounting of the eye member and the chart member relative to the connecting member, and embodies a flexible connection between the eye member and the chart member, and is capable of being folded in compact form for mailing, and is adapted to be opened into operative position without requiring any special skill.

I claim:

1. An eye testing device comprising a chart member, a connecting strip foldably connected with the chart member, an eye member foldably connected with the connecting strip, one of said members having a handle projection cut out of the connecting strip.

2. An eye testing device comprising a connecting member, an eye member foldably connected to the connecting member, and a chart member foldably connected to the connecting member, said chart member and said eye member each havng a handle projection cut out of the connecting member.

3. An eye testing device comprising an eye member, a chart member, and a connecting member positioned intermediate the eye member and chart member, all said members being formed from a single piece of material, the eye member and chart member being foldably engaged with the ends of the connecting member and said connecting member comprising two corresponding parts arranged end to end and foldable one upon the other.

4. An eye testing device comprising an eye member, a chart member, and a connecting member extending between the eye and chart members, one of the two last mentioned members being hinged to the connecting member and provided with a handle projecting at the hinged end of the hinged member and in the plane thereof, the connecting member being cut out to receive the handle member when the hinged member is folded into the plane of the connecting member.

5. An eye testing device made from a single blank and comprising an intermediate connecting member and terminal eye and chart members hinged to the ends of the connecting member, each terminal member being provided at its hinged end with an integral handle portion cut from the connecting member, said handle member capable of lying in the cut out in the end of the connecting member formed by cutting out the handle member.

BENJAMIN D. RITHOLZ.